United States Patent [19]

ViPond

[11] 4,141,141
[45] Feb. 27, 1979

[54] WIRE CUTTER
[75] Inventor: Clyde M. ViPond, Waterman, Ill.
[73] Assignee: Ideal Industire, Inc., Sycamore, Ill.
[21] Appl. No.: 836,209
[22] Filed: Sep. 23, 1977
[51] Int. Cl.² ............................................. B26B 17/04
[52] U.S. Cl. ................................................. 30/186
[58] Field of Search ................. 30/186, 187, 188, 191, 30/193, 91.2

[56] References Cited
U.S. PATENT DOCUMENTS

| 137,076 | 3/1873 | Hill | 30/191 |
|---|---|---|---|
| 1,349,563 | 8/1920 | Day | 30/176 X |
| 2,901,933 | 9/1959 | Wieser | 30/91.2 |
| 3,283,404 | 11/1966 | Hickman | 30/91.2 |

Primary Examiner—Jimmy C. Peters
Attorney, Agent, or Firm—Kinzer, Plyer, Dorn & McEachran

[57] ABSTRACT

A hand operated cutter for cutting insulated wire of fine guage ranging in size from 24 to 32 American wire gauge. The wire has a central cylindrical metal core of copper, which may be unplated or covered with a nickel, silver or tin plating. The wire core is encased in an annular layer of plastic insulation. The cutter includes a pair of elongated members pivotally connected to each other intermediate their ends to provide handles at one end for manual manipulation and cutting blades at the other end. Each cutting blade has a cutting edge facing the cutting edge of the other blade. The cutting edges are movable into alignment with each other upon closing action of the handles. Stop means are located adjacent the cutting edges to prevent the cutting edges from contacting each other upon closing action of the handles. The stop means provide a clearance between the cutting edges of the blades which is sufficiently small to permit the cutting edges to penetrate the wire core of the insulated wire and to reduce the effective cross-section of the insulated wire at the areas of penetration to bring about autogenous separation of the insulated wire.

3 Claims, 6 Drawing Figures

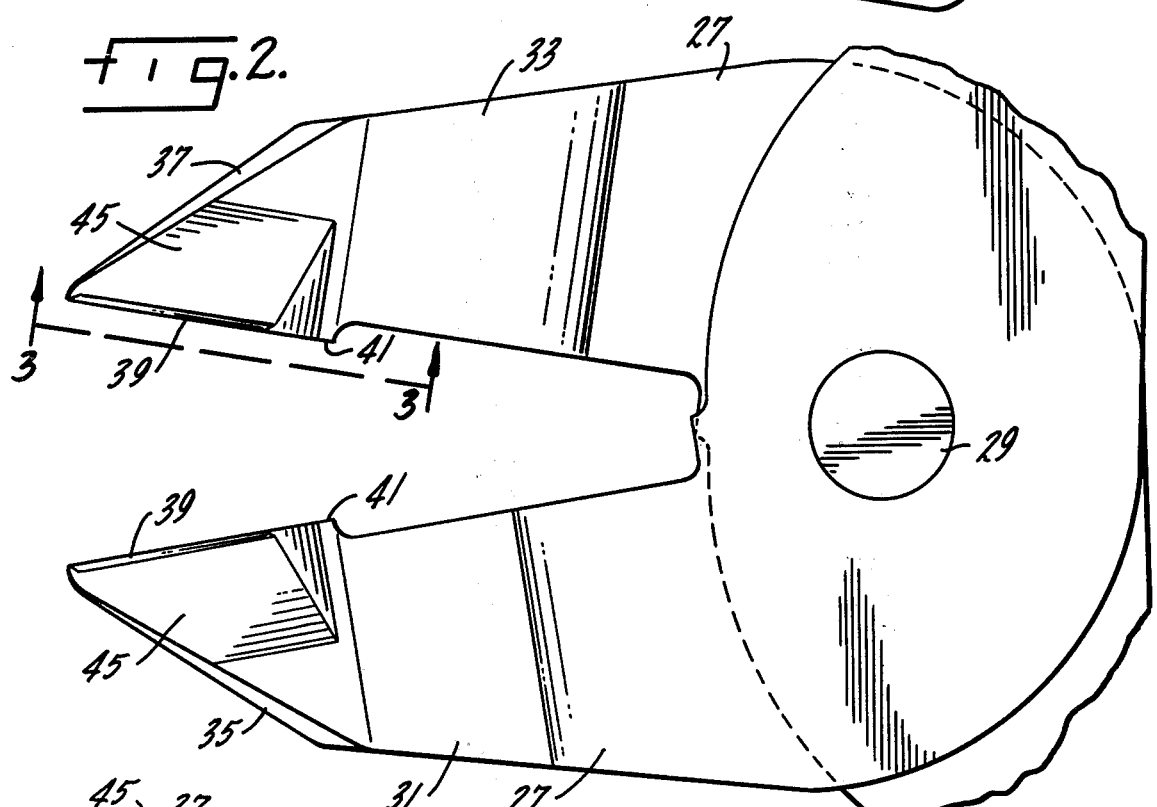

WIRE CUTTER

SUMMARY OF THE INVENTION

This invention is concerned with a precision hand tool useful for cutting fine gauge insulated wire while preventing projectiling of the ends of the wire which are cut off.

An object of this invention is a hand operated wire cutter which effectively severs fine gauge insulated wire without completely severing the wire core during cutting.

Another object of this invention is a hand operated wire cutter for fine gauge wire which relies on autogenous separation of the insulated wire after the insulation and wire core are partially cut through by action of the cutting blades.

Other objects may be found in the following specification, claims and drawings.

BRIEF DESCRIPTION OF THE DRAWINGS

The invention is illustrated more or less diagrammatically in the following drawings wherein:

FIG. 1 is a top plan view of a tool embodying the novel features of this invention;

FIG. 2 is an enlarged partial view of the cutting end of the tool of FIG. 1;

FIG. 3 is an enlarged partial view taken along lines 3—3 of FIG. 2;

FIG. 4 is a partial view taken along line 4—4 of FIG. 3 and showing a piece of fine gauge insulated wire positioned between the cutting blades of the tool;

FIG. 5 is a view similar to FIG. 4 but showing the cutting blades in their closed cutting position; and FIG. 6 is an enlarged cross sectional view showing the insulated wire after completion of the cutting stroke.

DESCRIPTION OF THE PREFERRED EMBODIMENT

FIG. 1 of the drawings shows a hand held tool 11 which is intended for use in cutting fine gauge insulated wire 13. The tool is especially constructed to cut fine gauge wire of the type used in electrical and electronic installations while preventing "projectiling" of the cut ends of the wire. "Projectiling" refers to the tendency of a small cut end of a piece of wire to be propelled or to fly through the air when it is severed. "Projectiling" of the cut end of a piece of wire occurs when the cutting blades of a tool completely sever the core and insulation of the wire during cutting. It is believed that "projectiling" is caused by the cutting edges of the blades applying an axial thrust to the wire as the cutting edges come together to sever the wire.

The tool 11 of this invention is intended for use in cutting fine gauge wire ranging in size from 24 to 32 American wire gauge. The core 15 of the wire may be formed of unplated copper or copper plated with nickel, silver or tin. The insulation 17 of the wire may be of any of the type conventionally applied to wire used in electrical and electronic applications. Suitable insulating materials include but are not limited to materials such as vinyl, fluorocarbon, polyethylene, polypropylene, fluoropolymer and even multi-wall insulation materials such as dual wall radiation cross-linked polyalkene and polyvinylidene fluoride.

The tool 11 includes two elongated members 21 and 23 of substantially similar construction. Conveniently, these members may be metal stampings. Each elongated member includes a handle portion 25 and a wire cutting blade portion 27. The blade portion of each member is offset both from the axis of the handle portion and laterally from the plane of the handle portion. The elongated members are pivotally connected by a rivet 29 extending through openings (not shown) formed in the axially offset portions of the members. The offset of each blade portion 27 from the plane of its handle portion is equal to one-half of the thickness of the handle portion so that the blade portions are aligned with each other when the handle portions are fastened together. This is accomplished by laterally offsetting portions 31 and 33 respectively of the members 21 and 23 in opposite directions so that they will be in the same plane when the handles are connected together. The tips 35 and 37 of the blade portions are upturned at angles of 45° to the planes of their respective handles and these tips form the cutting jaws of the tool.

Each tip 35 and 37 includes a cutting edge 39 which extends from the free end of the tip to a stop 41 located at the base of the tip. In this embodiment of the invention, the cutting edge 39 slopes at an angle of 60° relative to the undersurface 43 of the tip portion and at an angle of 30° relative to the axis of the wire being cut. Above the cutting edge, the tip is bevelled to provide a surface 45 extending at an angle of 30° relative to the undersurface 43 and at an angle of 60° relative to the axis of the wire being cut. The bevelled surface 45 provides the cutting edge 39 with an effective height of 0.025 inches.

The cutting edges 39 are ground so that the stops 41 prevent the cutting edges from contacting each other when the cutting blades 27 are closed. A clearance between the cutting edges in the range of zero to 0.003 inches is provided. This clearance or space between the cutting edges 39 of the blades prevents the blades from cutting all the way through the core 15 and insulation 17 of the wire. As a result, the cutting edges at their closest approach to each other leave uncut or unpenetrated portions of the core and insulation of the wire which are indicated respectively at 47 and 49 in FIG. 6. The thickness of the unsevered portions 47 and 49 will vary from zero to 0.003 inches in accordance with the clearance between the cutting edges 39. The unsevered portions of the wire core and insulation will not have sufficient strength to prevent automatic severance from the main portion of the wire either immediately after termination of the cutting action or after the cutting blades are moved out of supporting contact with the wire 13. The separation of the cut portion of the wire from the remainder will occur because the weight of the wire will break the unpenetrated portions 47 and 49 of the wire core and insulation. Sometimes, complete separation of the cut portion will require some movement of the wire. This action is referred to as autogenous separation of the wire and is due to the reduction of the cross-section of the wire at the areas of penetration by the cutting blades.

A compression spring 51 fits over projections 53 formed on the handle portions 25 of the elongated members 21 and 23 to bias the handle portions away from each other and the blade portions 27 away from each other. Insulating sheaths 55 are installed over the handle portions 25 outwardly of the compression spring 51. The insulating sheaths may be formed of vinyl or other suitable nonconductors of electricity.

I claim:

1. A hand operated cutter for cutting insulated wire of fine gauge, the wire being of the type having central cylindrical metal core surrounded by an annular layer of plastic insulation, the cutter including:

a pair of elongated members pivotally connected to each other intermediate their ends providing handles at one end for manual manipulation and cutting blades at the other end, each cutting blade having a cutting edge facing the cutting edge of the other blade and movable into alignment with the other cutting edge upon closing action of the handles, stop means located adjacent the cutting edges to prevent the cutting edges from contacting each other upon closing action of the handles, the stop means providing a clearance between the cutting edges of the blades which permits the cutting edges to penetrate the wire core and to reduce the effective cross-section of the insulated wire at the areas of penetration to bring about autogenous separation of the insulated wire.

2. The cutter of claim 1 in which the clearance between the cutting edges provided by the stop means is in the range of more than zero to 0.003 inches.

3. The cutter of claim 1 in which the stop means are positioned between the cutting edges of the cutting blades and the pivotal connection of the elongated members.

* * * * *